(12) United States Patent
Wang

(10) Patent No.: US 8,568,263 B2
(45) Date of Patent: Oct. 29, 2013

(54) GEAR TRANSMISSION

(75) Inventor: Hongyou Wang, Tsu (JP)

(73) Assignee: Nabtesco Corporation, Tokyo (JP)

( * ) Notice: Subject to any disclaimer, the term of this patent is extended or adjusted under 35 U.S.C. 154(b) by 247 days.

(21) Appl. No.: 13/123,965

(22) PCT Filed: Sep. 10, 2009

(86) PCT No.: PCT/JP2009/065798
§ 371 (c)(1),
(2), (4) Date: Apr. 13, 2011

(87) PCT Pub. No.: WO2010/047189
PCT Pub. Date: Apr. 29, 2010

(65) Prior Publication Data
US 2011/0207576 A1   Aug. 25, 2011

(30) Foreign Application Priority Data

Oct. 20, 2008   (JP) ................................ 2008-269476

(51) Int. Cl.
*F16H 1/32*   (2006.01)

(52) U.S. Cl.
USPC ........................................................ 475/162

(58) Field of Classification Search
USPC ................................................ 475/162, 168
See application file for complete search history.

(56) References Cited

U.S. PATENT DOCUMENTS

| | | | | |
|---|---|---|---|---|
| 6,699,152 B2 * | 3/2004 | Tanaka | ........................... | 475/149 |
| 7,056,253 B2 * | 6/2006 | Tsurumi et al. | ................ | 475/162 |
| 7,070,533 B2 * | 7/2006 | Tsurumi et al. | ................ | 475/168 |
| 2004/0185981 A1 * | 9/2004 | Tsurumi et al. | ................ | 475/162 |
| 2004/0192486 A1 * | 9/2004 | Tsurumi et al. | ................ | 475/168 |
| 2004/0254042 A1 * | 12/2004 | Tsurumi | ........................ | 475/163 |
| 2007/0034046 A1 * | 2/2007 | Stoianovici et al. | ............ | 74/640 |
| 2011/0207576 A1 * | 8/2011 | Wang | ............................ | 475/331 |

FOREIGN PATENT DOCUMENTS

| | | |
|---|---|---|
| DE | 10 2004 014 707 | 11/2004 |
| JP | 2-41748 U | 3/1990 |
| JP | 2-107846 A | 4/1990 |
| JP | 2004-293743 A | 10/2004 |

OTHER PUBLICATIONS

International Preliminary Report on Patentability dated May 17, 2011 for parent PCT application No. PCT/JP2009/065798.
Office Action from JPO mailed Dec. 11, 2012 for counterpart JP application No. 2008-269476, including English translation of substantive portions thereof.
Communication from EPO dated Mar. 19, 2012 for counterpart EP application No. 09821888.6, including European Search Opinion, Supplementary European Search Report and examined claims.
International Search Report for parent PCT application No. PCT/JP2009/065798.

* cited by examiner

*Primary Examiner* — David D Le
*Assistant Examiner* — Steven B Christ
(74) *Attorney, Agent, or Firm* — J-Tek Law PLLC; Jeffrey D. Tekanic

(57) ABSTRACT

A gear transmission comprises an external gear and an internal gear that rotates eccentrically relative to the external gear while meshing with the external gear. At least one first recess is formed on an outer peripheral side of the internal gear so that at least a portion of a motor is disposed within the first recess, thereby shortening the length and width of the device that includes the motor and the gear transmission in the axial and radial direction, respectively.

19 Claims, 3 Drawing Sheets

GEAR TRANSMISSION

CROSS-REFERENCE

This application is the U.S. national stage of International Patent Application No. PCT/JP2009/065798 filed on Sep. 10, 2009, which claims priority to Japanese Patent Application No. 2008-269476, filed on Oct. 20, 2008, the contents of which are hereby incorporated by reference into the present application.

TECHNICAL FIELD

This application relates to a gear transmission. In a preferred embodiment, this application relates to an eccentric oscillating-type gear transmission that eccentrically rotates an internal gear.

BACKGROUND ART

A gear transmission comprising an external gear and an internal gear is disclosed in Japanese Patent Publication No. 02-107846. In the following description, Japanese Patent Publication No. 02-107846 will be called Patent Document 1. The external gear is supported on a casing. The internal gear eccentrically rotates while meshing with the external gear. An engagement hole is formed in the internal gear. The engagement hole engages with an eccentric body of a crankshaft. Torque from a motor is transmitted to the crankshaft. When the crankshaft rotates, the internal gear eccentrically rotates, and the external gear rotates relative to the casing.

SUMMARY OF THE INVENTION

In the gear transmission of Patent Document 1, the gear transmission and the motor are disposed in series in the axial direction of the gear transmission. Consequently, the overall length of the device that includes the gear transmission and the motor is lengthened. In the present specification, a device that includes the gear transmission and the motor may simply be called the "gear transmission". In the alternative, the device that includes the gear transmission and the motor may be called a "motor-containing gear transmission". It is preferable for the motor-containing gear transmission to have a shorter overall length. If the motor is simply disposed on the outside in the radial direction of the gear transmission, the motor-containing gear transmission will become longer in the radial direction. It is preferable for the motor-containing gear transmission to also be shorter in the radial direction. Furthermore, the "radial direction" of the gear transmission means the direction perpendicular to the axial direction of the gear transmission. The present specification teaches techniques for realizing a gear transmission that devises the position of the motor such that the overall length is shortened and the length in the radial direction is also shortened.

In the type of gear transmission that eccentrically rotates the internal gear as shown in Patent Document 1, the shape of the outer periphery of the internal gear is not circular. Since the internal gear eccentrically rotates, the internal gear must be engaged with an eccentric body of a crankshaft. Space for an engagement hole that engages with the eccentric body needs to be maintained in a portion of the internal gear. Consequently, the length of the internal gear in the radial direction from the center to the outer periphery of the internal gear is not constant; the length of one portion is longer than the length of other portions. The length in the radial direction from the center to the outer periphery of the internal gear is short at the portion in which the engagement hole is not formed. That is, the internal gear is thicker in the radial direction at the portion in which the engagement hole is formed, and the internal gear is thinner in the radial direction at the portion in which the engagement hole is not formed. In other words, a recess is formed in the outer peripheral side of the internal gear. In the gear transmission of Patent Document 1, an inside wall of a casing protrudes into that recess. A bolt hole, etc. for affixing the casing is formed in the portion where the inside wall of the casing protrudes. The inventor focused on the shape of the outer periphery of the internal gear. In the techniques taught in the present specification, a recess, in which a portion of a motor is disposed, is formed on the outer peripheral side of the internal gear. In the techniques taught in the present specification, at least a portion of the motor is disposed within that recess. By disposing the motor as described above, the inventor succeeded in reducing the size of the gear transmission.

The techniques taught in the present specification can be realized in an eccentric oscillating-type gear transmission that eccentrically rotates an internal gear. This gear transmission comprises an external gear and the internal gear that rotates eccentrically relative to the external gear while meshing with the external gear. At least one first recess is formed on an outer peripheral side of the internal gear so that a portion of a motor is disposed within the first recess.

In the above-mentioned gear transmission, it is not necessary to dispose the gear transmission and the motor in series in the axial direction of the gear transmission. The overall length (the length in the axial direction) of the motor-containing gear transmission can be shortened. At least a portion of the motor can be disposed within the first recess. Consequently, as compared to the configuration in which the motor is disposed on the outside in the radial direction of the gear transmission, the length in the radial direction of the motor-containing gear transmission can be shortened in the above-mentioned gear transmission. Therefore, the above-mentioned gear transmission can reduce the size the device that includes the motor as compared to the conventional gear transmission.

In the gear transmission taught in the present specification, an axis of the motor may pass through the first recess. In this case, one-half or more of the diameter of the motor (the length of the motor in the radial direction) is disposed within the first recess. Consequently, the size of the motor-containing gear transmission can be sufficiently reduced in the radial direction of the gear transmission. Further, the motor may be disposed within a casing of the gear transmission. The length in the radial direction of the gear transmission including the motor becomes equal to the length in the radial direction of a gear transmission that does not include a motor. The size of the motor-containing gear transmission in the radial direction of the gear transmission can be further reduced.

If a small-sized motor is used, the size of the motor-containing gear transmission can be made smaller. However, the required amount of torque might not be obtained when using the small-sized motor. If a plurality of motors is provided, the required amount of torque can be obtained even when using the small-sized motors. Further, if a plurality of crankshafts is provided, the internal gear can be made to eccentrically rotate in a stable manner. Consequently, a plurality of first recesses may be formed in the gear transmission along the circumferential direction of the outer peripheral side of the internal gear. Further, the gear transmission may comprise a crankshaft that eccentrically rotates the internal gear and passes through the internal gear at a position between two adjacent first recesses. Furthermore, it is not necessary to dispose a motor in every first recess. Further, it is not necessary to dispose a crankshaft between each two adjacent first recesses. Therefore, the number of first recesses and the number of crankshafts do not need to be equal. A plurality of motors may transmit torque to one crankshaft. Further, crankshafts may be present, via which torque is not transmitted from the motor(s). In this case, the crankshafts, via which torque is not transmitted from the motor(s), contribute to stabilizing the rotational balance of the internal gear by rotating in a manner that is dependent upon the eccentric rotation of the internal gear.

At least one second recess may be formed on an inside wall of the casing of the gear transmission, and at least a portion of a crankshaft may pass through the second recess. As described above, the engagement hole for engaging with the eccentric body of the crankshaft is formed in the internal gear. The length of the internal gear in the radial direction from the center to the outer periphery of the internal gear at the portion(s) thereof, in which an engagement hole is formed, is longer than other portions so that space(s) for the engagement hole(s) can be maintained. If a second recess is formed on the inside wall of the casing, and at least a portion of a crankshaft passes through the second recess, the size of the gear transmission in the radial direction can be further reduced.

In case the gear transmission comprises a plurality of crankshafts, each of the plurality of crankshafts may respectively extend through the internal gear at a position between two adjacent first recesses, and each motor may be respectively disposed within one first recess. Each of the motors may transmit torque to one respective crankshaft. According to this configuration, the number of crankshafts and motors is equal. Consequently, the torque from the motors can be evenly transmitted to all the crankshafts. The rotational balance of the gear transmission improves.

In the gear transmission taught in the present specification, the length of the motor may be less than or equal to the length of the gear transmission in the axial direction of the gear transmission. The motor can be disposed between imaginary surfaces extending from both end surfaces in the axial direction of the gear transmission. The length in the axial direction of the gear transmission that includes the motor can be made equal to the length in the axial direction of a gear transmission that does not include a motor.

The techniques taught in the present specification make it possible that the size of a device including a gear transmission and a motor is smaller than the conventional device.

DESCRIPTION OF THE EMBODIMENTS

Before describing the embodiments in detail, principal features of the gear transmission taught in the present specification will be described. The gear transmission comprises a casing, an external gear, an internal gear and a crankshaft. The external gear is rotatably supported in the casing. The crankshaft is rotatably supported in the casing and comprises an eccentric body and an input gear. Torque from a motor is transmitted to the input gear of the crankshaft. An engagement hole extending alongside the axis of the gear transmission is formed in the internal gear. The engagement hole engages with the eccentric body of the crankshaft. The internal gear meshes with the external gear. When the crankshaft rotates, the internal gear eccentrically rotates while meshing with the external gear. A first recess is formed in the outer periphery of the internal gear. At least a portion of the motor is disposed within the first recess. The motor is affixed to the casing outward of the internal gear.

Figure 1:
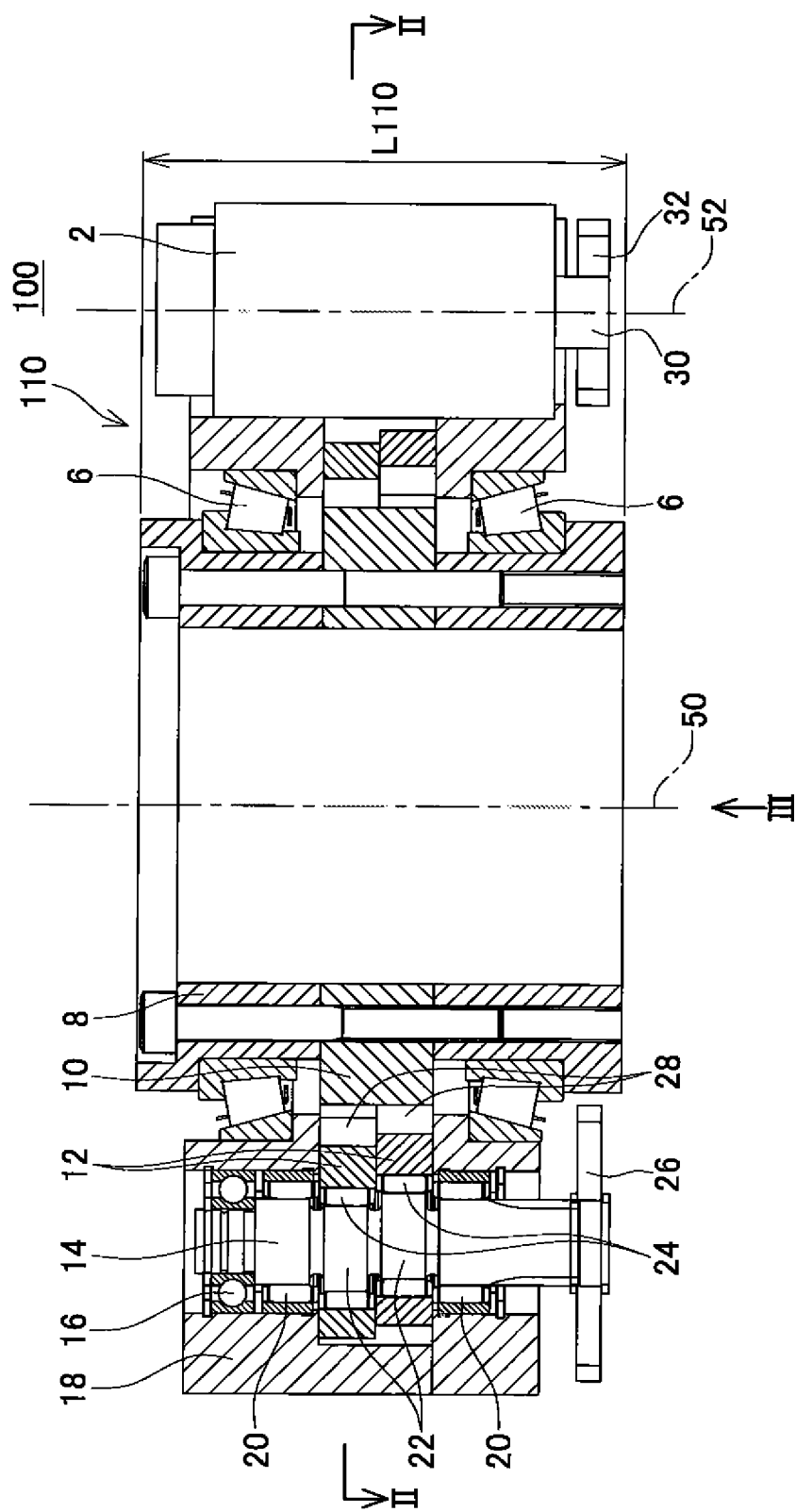
FIG. 1 shows a cross-sectional view along the axial direction of a motor-containing gear transmission.
Figure 2:
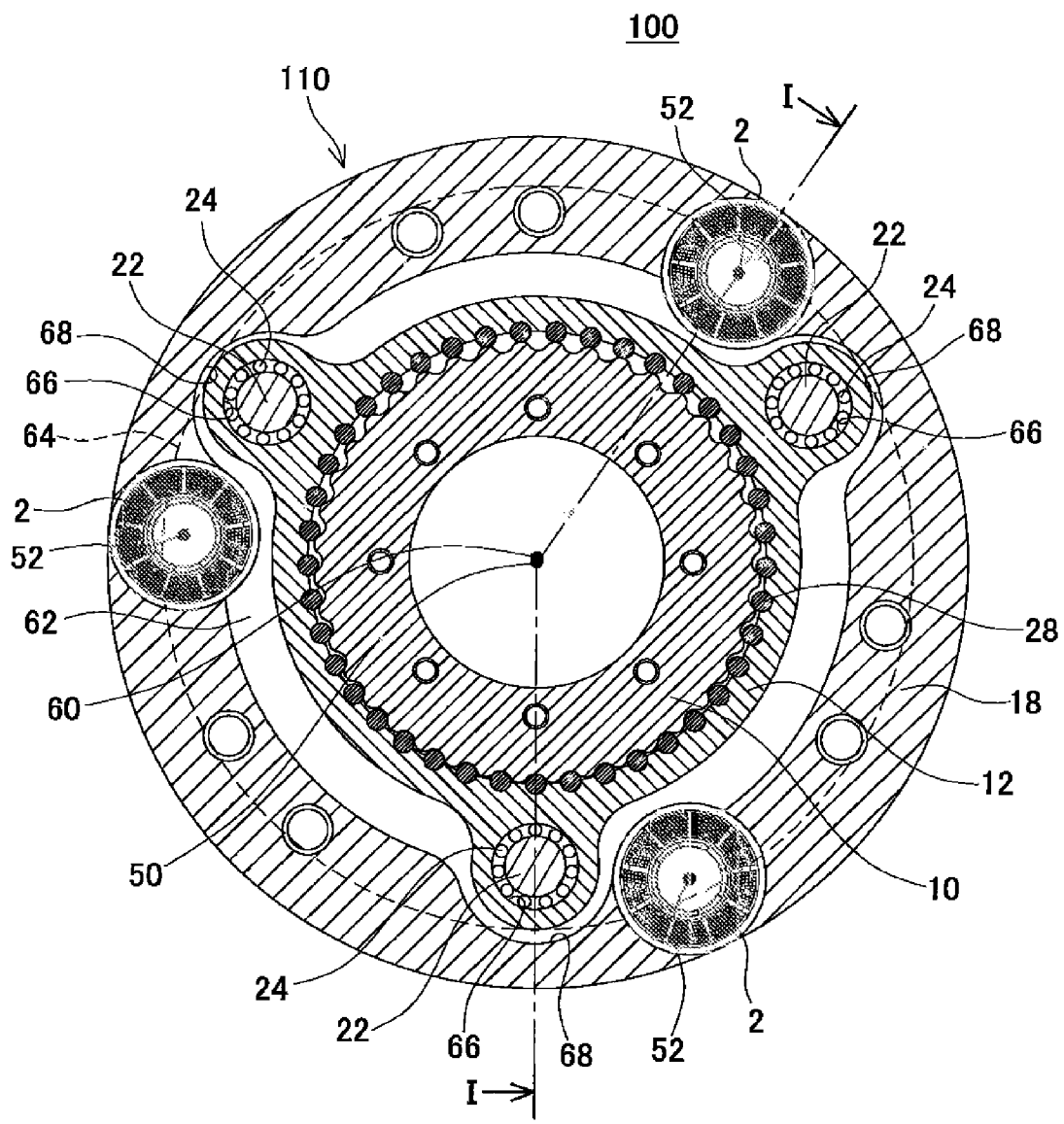
FIG. 2 shows a cross-sectional view along line II-II of FIG. 1.
Figure 3:
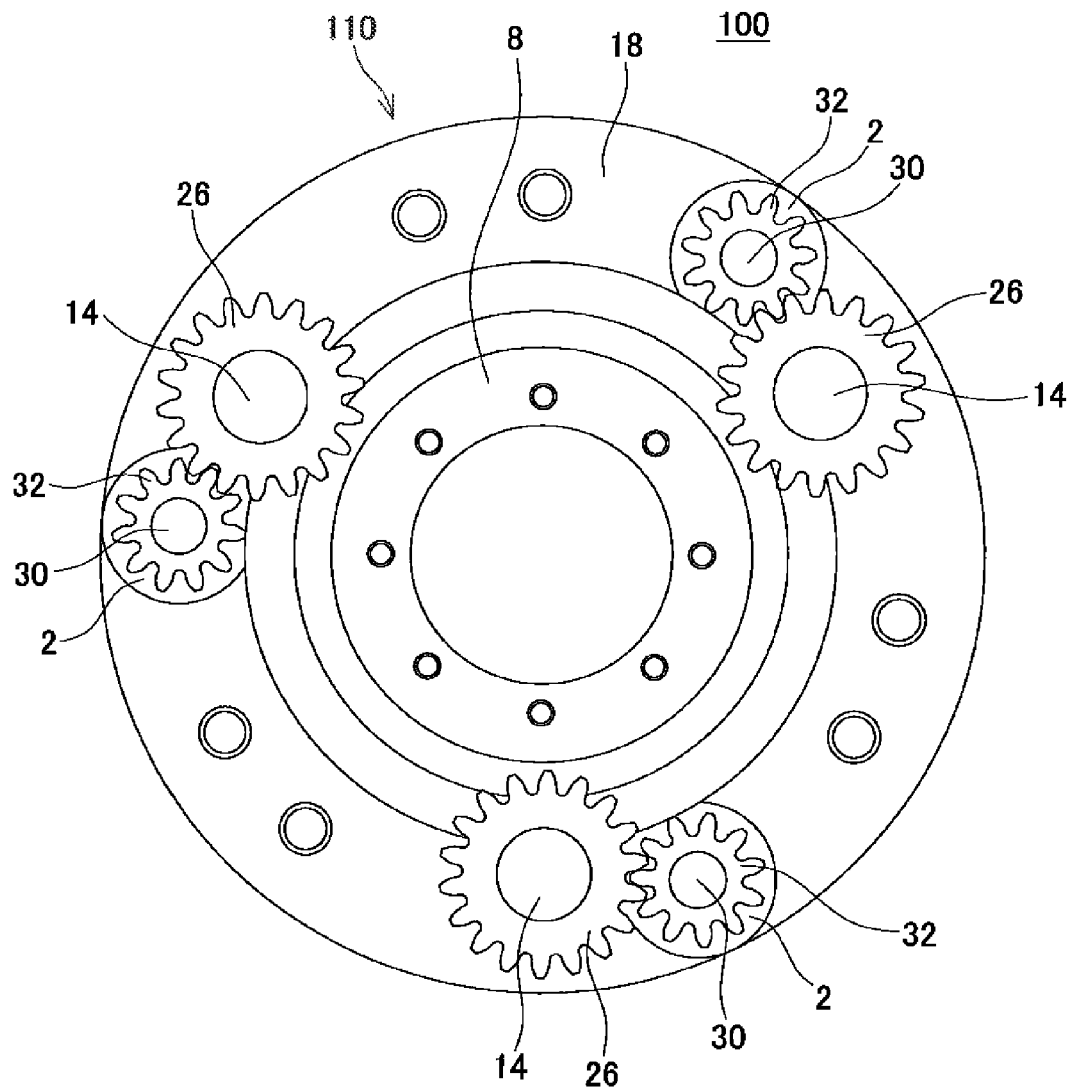
FIG. 3 shows a view of the motor-containing gear transmission observed from arrow III of FIG. 1.

FIG. 1 and FIG. 2 show cross-sectional views of a motor-containing gear transmission 100. FIG. 1 shows a cross-sectional view along axis 50 of the motor-containing gear transmission 100. FIG. 2 shows a cross-sectional view of a plane perpendicular to the axis 50 of the motor-containing gear transmission 100. Furthermore, FIG. 2 is a cross-sectional view along line II-II of FIG. 1, and FIG. 1 is a cross-sectional view along line I-I of FIG. 2. FIG. 3 shows an exterior view of the motor-containing gear transmission 100 observed from the direction of arrow III of FIG. 1. Furthermore, reference number 60 of FIG. 2 indicates the center of an internal gear 12 described below.

As shown in FIG. 1 and FIG. 2, the motor-containing gear transmission 100 comprises a gear transmission 110 and a plurality of motors 2. The gear transmission 110 comprises a casing 18, a carrier 8, an external gear 10, crankshafts 14 and the internal gear 12. Since the gear transmission 110 and the motor-containing gear transmission 100 are coaxial, in the following description the axis 50 may be called the axis 50 of the gear transmission 110. The carrier 8 is rotatably supported on the casing 18 by a pair of tapered roller bearings 6. The external gear 10 is affixed to the carrier 8. Consequently, the external gear 10 can be said to be rotatably supported on the casing 18. The crankshafts 14 are each rotatably supported on the casing 18 by a deep groove ball bearing 16 and a cylindrical roller bearing 20. An eccentric body 22 is formed on the crankshaft 14. Further, an input gear 26 is affixed to the crankshaft 14. The motors 2 are affixed to the casing 18.

As shown in FIG. 2, a plurality of engagement holes 66 is formed along the circumferential direction of the outer peripheral side of the internal gear 12. The engagement holes 66 are formed in positions offset from the center 60 of the internal gear 12. The eccentric bodies 22 engage with the engagement holes 66 via needle roller bearings 24. As described above, the eccentric bodies 22 are formed on the crankshafts 14, and the eccentric bodies 22 engage with the engagement holes 66. In the state that the crankshafts 14 pass through the internal gear 12, it can also be said that the crankshafts 14 engage with the engagement holes 66 of the internal gear 12. Consequently, the internal gear 12 can be said to be supported on the casing 18 via the crankshafts 14.

The thickness of the internal gear 12 in the radial direction is not constant. In other words, the length of the internal gear 12 in the radial direction from the center 60 to the outer periphery is not constant. In order to maintain space for the engagement holes 66 that engage with the eccentric bodies 22, a plurality of positions on the internal gear 12 are formed to be thicker in the radial direction. In case of the gear transmission 110, the lengths at three positions in the radial direction from the center 60 to the outer periphery of the internal gear 12 are longer than at other portions. Consequently, portions of the outer periphery of the internal gear 12 protrude outwardly in the radial direction at the plurality of positions. The engagement holes 66 are formed substantially equidistantly along the circumferential direction of the internal gear 12. The eccentric bodies 22 engage with the engagement holes 66. Furthermore, since the eccentric bodies 22 are formed on the crankshafts 14, the crankshafts 14 can also be said to be disposed substantially equidistantly along the circumferential direction of the internal gear 12. The crankshafts 14 can also be said to pass through the internal gear 12 at the engagement holes 66.

The portions of the internal gear 12, in which the engagement holes 66 are not formed, are thinner in the radial direction. Reference number 64 of FIG. 2 indicates an imaginary outer periphery line, which corresponds to the case that the thickness of the internal gear 12 in the radial direction is constant, i.e., the case that the outer periphery of the internal gear 12 is circular. If the imaginary outer periphery line 64 is considered to be the intrinsic outer periphery of the internal gear 12, portions of the actual outer periphery of the internal gear 12 are recessed toward the center 60 of the internal gear. Each area enclosed by the imaginary outer periphery line 64 of the internal gear 12 and the actual outer periphery of the internal gear 12 can be considered to be a recess 62 in the outer periphery of the internal gear 12. Consequently, it can be considered that three recesses 62 are formed in the internal gear 12. As described above, the crankshafts 14 pass through the internal gear 12 at the engagement holes 66. Consequently, it can be said that the crankshafts 14 pass through the internal gear 12 between adjacent recesses 62. Furthermore, the recess 62 is an example of a first recess. A plurality of inner pins 28 is attached to an inner peripheral surface of the internal gear 12. The inner pins 28 mesh with the external gear 10.

A portion of each motor 2 is disposed within the respective recesses 62 of the internal gear 12. More precisely, an axis 52 of the motor 2 passes through the recess 62 of the internal gear 12. In other words, the motors 2 protrude into the recesses 62 from the outside of the internal gear 12. Furthermore, in the motor-containing gear transmission 100, the outer periphery of the motors 2 is disposed inside the casing 18. Therefore, the motors 2 are covered by the casing 18. Consequently, when the motors 2 are attached to the gear transmission 110, the outer diameter of the motor-containing gear transmission 100 is equal to the outer diameter of the gear transmission 110 prior to the attachment of the motors 2. In other words, the length in the radial direction of the motor-containing gear transmission 100 is equal to the length in the radial direction of the gear transmission 110. Further, as shown in FIG. 1, the length of the motors 2 in the direction of the axis 52 is shorter than the length L110 of the gear transmission 110 in the direction of the axis 50. The motors 2 are disposed between imaginary surfaces extending from both end surfaces in the direction of the axis 50 of the gear transmission 110. Consequently, the length of the motor-containing gear transmission 100 in the direction of the axis 50 is equal to the length of the gear transmission 110 in the direction of the axis 50. The gear transmission 110 makes possible a reduction of the size of the motor-containing gear transmission as compared to the conventional gear transmission.

A plurality of recesses 68 is formed in the inner peripheral surface of the casing 18, i.e., in the inside wall of the casing 18. Three recesses 68 are formed in the gear transmission 110. The recess 68 is an example of a second recess. The portions of the internal gear 12, in which the engagement holes 66 are formed, are disposed in the recesses 68. In other words, a portion of the crankshaft 14 (see FIG. 1) passes through the recess 68 of the casing 18. Consequently, the imaginary outer periphery line 64 of the internal gear 12 overlaps with the casing 18. In case the recesses 68 were not formed in the casing 18, the casing 18 would need to be disposed outside the imaginary outer periphery line 64. In this case, the length of the gear transmission 110 in the radial direction would increase. Since the recesses 68 are formed in the casing 18, and the portions of the internal gear 12 are disposed in the recesses 68, the length of the gear transmission 110 in the radial direction can be made extremely short.

The operation of the gear transmission 110 will be described. As shown in FIG. 2, the eccentric bodies 22 formed on the crankshafts 14 are engaged with the engagement holes 66. Consequently, when the crankshafts 14 rotate, the eccentric bodies 22 eccentrically rotate, and the internal gear 12 eccentrically rotates about the axis 50. The number of teeth of the internal gear 12 (the number of inner pins 28) differs from the number of external teeth of the external gear 10. Consequently, when the internal gear 12 rotates eccentrically, the external gear 10 and the internal gear 12 rotate relative to one another. As described above, the carrier 8 is affixed to the external gear 10 and the internal gear 12 is supported on the casing 18. Consequently, when the crankshafts 14 rotate, the carrier 8 rotates relative to the casing 18.

Other features of the gear transmission 110 will be described. As shown in FIG. 3, an output gear 32 is affixed to an output shaft 30 of each of the motors 2. Each of the output gears 32 meshes with the input gear 26 of the respective crankshaft 14. The same amount of torque is transmitted to each of the plurality of crankshafts 14. Furthermore, as shown in FIG. 2, one motor 2 is respectively disposed within each recess 62. In the gear transmission 110, the number of motors 2 and the number of crankshafts 14 is equal. As described above, the crankshafts 14 are disposed substantially equidistantly along the circumferential direction of the internal gear 12. Consequently, the internal gear 12 rotates in a well-balanced manner.

In the above embodiment, each of the input gears 26 meshes with one respective output gear 32 of the motors 2. Instead of this configuration, two or more output gears 32 may mesh with one input gear 26. In this case, a large torque can be transmitted to the crankshafts 14.

Further, the input gear 26 may be affixed, at the least, to one crankshaft 14. In this case, the motor(s) 2 transmit(s) torque only to the crankshaft 14 that has been affixed to the input gear 26. Since the number of input gears 26 can be reduced, the number of parts of the gear transmission can be reduced.

In the above embodiment, the shape of the outer periphery of the internal gear 12 was described with reference to the recesses 62. Instead of the recesses 62, the shape of the outer periphery of the internal gear 12 may be described with reference to projections for maintaining space for the engagement holes 66. With the projections as the reference, the feature of the gear transmission 110 of the embodiment may alternatively be described as follows: a plurality of projections for maintaining spaces for the engagement holes 66 are formed along the circumferential direction on the outer peripheral side of the internal gear 12. The motors 2 may be affixed to the casing 18 such that a portion of each motors 2 overlaps with the respective projections along the circumferential direction of the internal gear 12.

In the above embodiment, the motor-containing gear transmission 100 comprises the plurality of motors 2 and the plurality of recesses 62 (first recesses). A portion of each motor 2 is disposed in each respective recess 62. The present invention is also suitable for being applied to a motor-containing gear transmission that has only one motor and one first recess. In that case, a portion of the one motor may be disposed in the one recess. In summary, the motor-containing gear transmission taught in the present specification may comprise at least one motor and at least one first recess, and a portion of the at least one motor may be disposed in the at least one recess.

Specific examples of the present invention are described above in detail, but these examples are merely illustrative and place no limitation on the scope of the patent claims. The technology described in the patent claims also encompasses various changes and modifications to the specific examples described above. The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

The invention claimed is:

1. A gear transmission comprising:
   an external gear;
   an internal gear that is eccentrically rotatable relative to the external gear while meshing with the external gear;
   at least one crankshaft configured to eccentrically rotate the internal gear and passing through the internal gear; and
   a motor comprising a motor body and an output shaft that is rotatable relative to the motor body;
   wherein at least one first recess is formed on an outer peripheral side of the internal gear, the at least one first recess being disposed radially inward of an imaginary circle that intersects a radially-outermost portion of the outer peripheral side of the internal gear,
   at least a portion of the motor body is disposed within the first recess,
   the at least one crankshaft and the output shaft of the motor extend in parallel to each other, and
   the gear transmission has an axial length in an axial direction thereof, and the motor has an axial length in the axial direction that is less than or equal to the axial length of the gear transmission, such that the motor is axially disposed entirely within the axial length of the gear transmission.

2. The gear transmission according to claim 1, wherein an axis of the output shaft passes through the first recess.

3. The gear transmission according to claim 2, wherein the motor body is disposed within a casing of the gear transmission.

4. The gear transmission according to claim 3, wherein:
   a plurality of first recesses is formed along a circumferential direction of the outer peripheral side of the internal gear; and
   the crankshaft passes through the internal gear at a position between two adjacent first recesses.

5. The gear transmission according to claim 4, wherein at least one second recess is formed on an inside wall of the casing of the gear transmission, and at least a portion of the crankshaft passes through the second recess.

6. The gear transmission according to claim 5, wherein:
   the gear transmission comprises a plurality of crankshafts; and
   each of the plurality of crankshafts passes through the internal gear at respective positions between two adjacent first recesses;
   at least one motor is disposed within each respective first recess; and
   each motor transmits torque to a respective crankshaft.

7. The gear transmission according to claim 6, wherein each motor has a length in the axial direction of the gear transmission that is less than or equal to the axial length of the gear transmission.

8. The gear transmission according to claim 7, wherein the motor bodies are affixed to the casing between the internal gear and a cylindrical outer surface of the casing in a radial direction of the gear transmission.

9. The gear transmission according to claim 8, wherein the number of motors is equal to the number of crankshafts and the crankshafts are disposed substantially equidistantly around the circumferential direction of the internal gear.

10. The gear transmission according to claim 9, further comprising a plurality of output gears, wherein each output gear is affixed to the output shaft of one motor and meshes with an input gear of a respective crankshaft.

11. The gear transmission according to claim 1, wherein:
    a plurality of first recesses is defined in the outer peripheral side of the internal gear, the first recesses being distributed around a circumferential direction of the internal gear; and
    the crankshaft passes through the internal gear at a position between two adjacent first recesses in the circumferential direction.

12. The gear transmission according to claim 11, wherein at least one second recess is formed on an inside wall of a casing of the gear transmission, and at least a portion of the crankshaft passes through the second recess.

13. The gear transmission according to claim 1, wherein:
    a plurality of first recesses is defined in the outer peripheral side of the internal gear, the first recesses being distributed around a circumferential direction of the internal gear; and
    the gear transmission further comprises:
    a plurality of crankshafts configured to eccentrically rotate the internal gear, the crankshafts passing through the internal gear at respective positions between two adjacent first recesses in the circumferential direction, and
    a plurality of motors configured to transmit torque to the respective crankshafts, at least one motor body being at least partially disposed within each first recess.

14. The gear transmission according to claim 1, wherein a plurality of motor bodies is affixed to a casing of the gear transmission between the internal gear and a cylindrical outer surface of the casing in a radial direction of the gear transmission.

15. The gear transmission according to claim 14, further comprising a plurality of crankshafts equal to the number of motors, the crankshafts being disposed substantially equidistantly around a circumferential direction of the internal gear.

16. The gear transmission according to claim 15, further comprising a plurality of output gears, wherein each output gear is affixed to an output shaft of one motor and meshes with an input gear of a respective crankshaft.

17. A gear transmission comprising:
    an external gear,
    an internal gear meshing with the external gear and being eccentrically rotatable relative to the external gear, the internal gear including a plurality of radially-extending projections distributed around a circumferential direction of the internal gear, each projection having an engagement hole defined therein,
    a plurality of crankshafts eccentrically rotatably disposed within the respective engagement holes, and
    a plurality of motors configured to rotatably drive the respective crankshafts, wherein the motors are distributed around the circumferential direction of the internal gear and at least portion of a motor body of each motor overlaps in a radial direction of the internal gear with adjacent radially-extending projections;

wherein each motor has an output shaft and the output shafts of the motors extend in parallel to the crankshafts, and the gear transmission has an axial length in an axial direction thereof, and the motors each have an axial length in the axial direction that is less than or equal to the axial length of the gear transmission, such that each motor is axially disposed entirely within the axial length of the gear transmission.

18. The gear transmission according to claim 17, wherein:

a rotational axis of the output shaft of each motor is disposed radially inward of radially-outermost portions of the projections.

19. The gear transmission according to claim 18, wherein:

the motor bodies are affixed to a casing of the gear transmission between the internal gear and a cylindrical outer surface of the casing in a radial direction of the gear transmission, the number of motors is equal to the number of crankshafts, the crankshafts are disposed at least substantially equidistantly around the circumferential direction of the internal gear, and an output gear is affixed to the output shaft of each motor and meshes with an input gear of a respective crankshaft.

* * * * *